United States Patent
Brennom

(10) Patent No.: US 7,712,490 B2
(45) Date of Patent: May 11, 2010

(54) METHOD AND APPARATUS FOR LOADING CATALYST

(75) Inventor: Stephen Brennom, Pasadena, TX (US)

(73) Assignee: Clean Harbors Catalyst Technologies, LLC, Pasadena, TX (US)

( * ) Notice: Subject to any disclaimer, the term of this patent is extended or adjusted under 35 U.S.C. 154(b) by 698 days.

(21) Appl. No.: 11/377,798

(22) Filed: Mar. 16, 2006

(65) Prior Publication Data

US 2007/0215236 A1 Sep. 20, 2007

(51) Int. Cl.
*B65B 1/20* (2006.01)
*A01C 17/00* (2006.01)

(52) U.S. Cl. .................. 141/12; 141/256; 141/284; 239/681

(58) Field of Classification Search ............... 141/2, 141/11, 12, 71, 73, 250–260, 263, 284; 414/301; 366/64, 248; 239/681
See application file for complete search history.

(56) References Cited

U.S. PATENT DOCUMENTS

| | | | | | |
|---|---|---|---|---|---|
| 1,506,142 | A | * | 8/1924 | Stubbs ................. | 366/64 |
| 2,114,103 | A | * | 4/1938 | Driscoll et. al. ........... | 141/73 |
| 2,295,529 | A | | 9/1942 | Gooden | |
| 2,330,862 | A | * | 10/1943 | Bleam ................. | 141/49 |
| 3,166,303 | A | * | 1/1965 | Chapman ............... | 366/129 |
| 3,249,342 | A | * | 5/1966 | Mikkelsen .............. | 241/98 |
| 3,608,751 | A | | 9/1971 | Hundtofte | |
| 3,749,258 | A | | 7/1973 | James | |
| 4,564,328 | A | * | 1/1986 | Loutaty et al. ............ | 414/301 |
| 4,786,001 | A | * | 11/1988 | Ephraim et al. .......... | 241/101.8 |
| 4,821,782 | A | * | 4/1989 | Hyer .................. | 141/83 |
| 5,247,970 | A | * | 9/1993 | Ryntveit et al. .......... | 141/1 |
| 5,795,550 | A | * | 8/1998 | Minami ................ | 422/219 |
| 6,467,513 | B1 | | 10/2002 | Yanaru et al. | |

FOREIGN PATENT DOCUMENTS

| | | |
|---|---|---|
| EP | 0 522 858 A1 | 1/1993 |
| EP | 0 548 999 A1 | 6/1993 |
| EP | 1 283 070 A2 | 2/2003 |
| GB | 2 330 828 A1 | 5/1999 |
| WO | WO 00/44488 | 8/2000 |
| WO | WO 2004/096428 | 11/2004 |

OTHER PUBLICATIONS

PCT International Search Report from International Application No. PCT/US2004/012390 dated Sep. 2, 2004.
PCT International Search Report from International Application No. PCT/US07/63718 dated May 5, 2008.

* cited by examiner

*Primary Examiner*—Timothy L Maust
(74) *Attorney, Agent, or Firm*—Patterson & Sheridan, LLP

(57) ABSTRACT

Methods and apparatus prevent breakage of a catalyst particle and evenly fill the catalyst into tubes to an optimum density. A loading tool comprises a plurality of damper members extending from a centerline of the tube in at least one radial direction but in every case, having a diameter smaller than the inner diameter of the tube. For example, in one embodiment the damper members are shaped in a "Z"-like formation with each having a different rotational orientation than the adjacent one above or below it. The Z formations can be horizontally arranged along a central member or can be formed vertically in a unitary fashion from a single, stiffened member. In another embodiment, the dampers are formed into spiral or helical shapes that increase or decrease in diameter along the length of the tube.

13 Claims, 3 Drawing Sheets

METHOD AND APPARATUS FOR LOADING CATALYST

BACKGROUND OF THE INVENTION

1. Field of the Invention

Embodiments of the present invention generally relate to methods and apparatus for filling particulate material into a tube. More particularly embodiments of the present invention generally relate to methods and apparatus for filling a catalyst into a tube of a primary reformer furnace.

2. Description of the Related Art

Primary reformer furnaces such as those used in the production of ammonia, hydrogen and methanol typically utilize tens or hundreds of heat transfer tubes that are filled with catalyst particles. These tubes must initially be filled with catalyst, and used catalyst must be replaced with fresh catalyst periodically. Voids in the catalyst fill can easily form if catalyst particles are introduced to the tubes too quickly or non-uniformly during the filling of the tubes. Also, catalyst particles can fracture or crush if they are allowed to free-fall too far during filling of the tubes. Voids or crushed catalyst create local density variations as well as a catalyst density that is less than optimal. Local density variations differ from tube to tube and cause variations in the pressure drop over the tubes. This results in distortions of gas distribution in a multi-tube reactor and causes uneven temperature distribution over the tubes during operation of the reactor. The resultant thermal and mechanical stress in the tube can reduce its useful life. To reduce voids the tube can be vibrated by such methods as tapping or vibrating the upper part of the tube. However, this is laborious and delays the filling operation. Additionally, tapping or vibration can expose the tube to extra mechanical stress. If excessive crushing or fracturing of catalyst particles occurs during filling, the only remedy is to remove all catalyst from the tube and refill it properly. This adds substantial labor and results in the loss of expensive catalyst One method for reducing density variations utilizes a short sock or sock-like member made of a material such as a soft plastic that is first filled with the catalyst. The catalyst can be delivered from the manufacturer already in the socks. When filling the tubes, a sock filled with catalyst is fastened onto a line and lowered towards the bottom of each tube. By jerking the line, the sock opens at its bottom and the catalyst flows into the tube with a minimum of free fall. However, there are several disadvantages with this method. Filling one tube with this method usually requires a number of the socks thereby making the method laborious. Sometimes, the sock will open prematurely, allowing the catalyst particles to fall a great distance and achieve enough gravimetrically induced velocity to crush or fracture when they hit the bottom of a tube. If the sock contains voids among the particles of catalyst, then corresponding voids will typically form in the tube when the sock is emptied. Consequently, the tubes must be exposed to tapping or vibrating to secure reasonably even gas distribution over the tubes.

Another method for attaining good and even packing of catalyst into a tube includes filling the tube with water and then pouring in the catalyst. However, this method requires that the water subsequently be completely removed. Removal of the water and necessary subsequent drying takes a long time. Additionally, used water requires special treatment, adding time and cost.

RD Patent Application RD-253040-A describes a method for filling a tube with a catalyst by adding the catalyst to the upper part of the tube by means of a transporter comprising a slowly rotating arrangement. The catalyst is transported from a container through a duct in which there is a rod with oblique/transverse propeller wings or brushes. The catalyst particles are then transported to the upper end of the catalyst tube and fall smoothly into the tube. However, the particles must be added slowly in order to get even filling of the tube. Further, the catalyst drops a significant length especially during the first part of the filling operation thereby permitting the catalyst to be crushed or broken during the fall. Therefore, the particles can pack unevenly over the vertical length of the tube and the filling time can be long.

Therefore, there exists a need for a catalyst loading tool that is cost effective to manufacture and is easily configurable to accommodate particular loading requirements for a given reactor. There exists a further need for a catalyst loading tool that permits filling of reactor tubes evenly without breaking the catalyst particles.

SUMMARY OF THE INVENTION

Embodiments of the present invention generally relate to methods and apparatus that prevent breakage of a catalyst particle and evenly fill the catalyst into tubes to an optimum density. The loading tool comprises a plurality of damper members extending from a centerline of the tube in at least one radial direction but in every case, having a diameter smaller than the inner diameter of the tube. For example, in one embodiment the damper members are shaped in a "Z"-like formation with each having a different rotational orientation than the adjacent one above or below it. The Z formations can be horizontally arranged along a central member or can be formed vertically in a unitary fashion from a single, stiffened member. In another embodiment, the dampers are formed into spiral or helical shapes that increase or decrease in diameter along the length of the tube.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is used with a catalyst filling process where pellets of catalyst are placed in a tube with the help of a loading tool. The loading tool comprises dampers that are formed into repeating shapes from material such as a wire or the like in a manner whereby at least a portion of the dampers are substantially transverse and axially arranged to provide substantially circumferential coverage along a longitudinal length of the tube. The distance between damper members can be substantially equal or can vary. The plurality of damper members reduces the falling velocity of the particles and diverts the particles from falling in straight downward paths.

Figure 1:
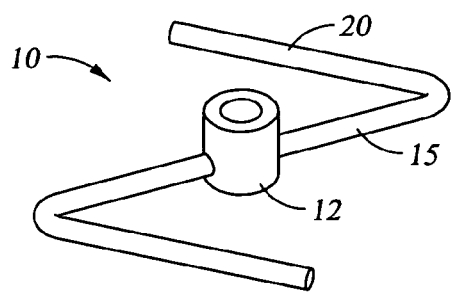
FIG. 1 shows one embodiment of a damper member that is formed horizontally relative to a filler tube.
Figure 3:
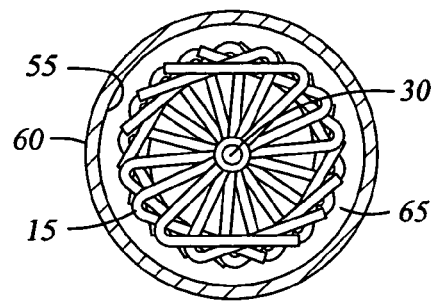
FIG. 3 is a top view of the embodiment of FIG. 2 in a tube.
Figure 2:
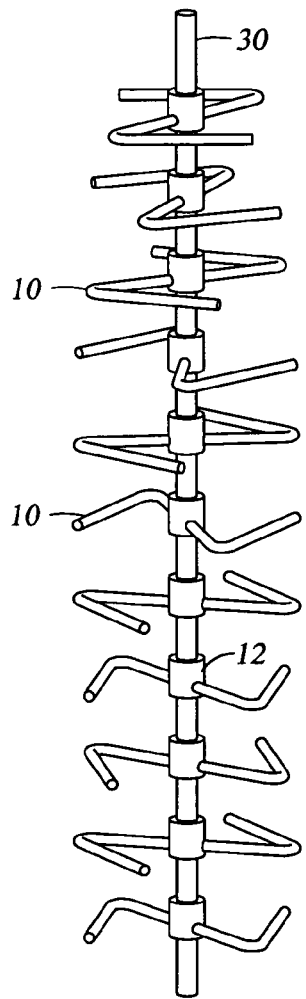
FIG. 2 shows the dampers of FIG. 1 arranged along a central member.
Figure 4:
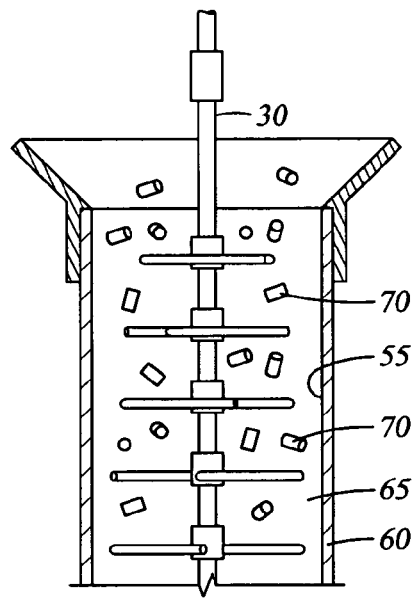
FIG. 4 is a section view showing the tool of FIG. 2 in a loading tube being filled with particles.
Figure 4:
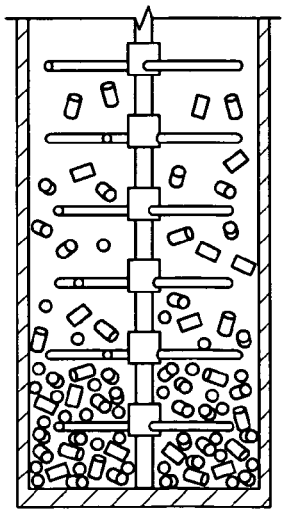

In the embodiment shown in FIGS. 1-4, dampers 10 are arranged in a horizontal manner along a central member 30. Each damper is symmetrically shaped and includes a central portion 12 and arms 15 extending outwards from each side of the portion 12 in a single plane that is perpendicular to the longitudinal axis of the central member 30. In the embodiment shown, a cross arm 20 extends at an angle of less than ninety degrees from an end of each arm 15. As shown in FIGS. 2 and 4, the dampers 10 are arranged along the central member 30 in a manner wherein each damper is rotationally distinct from the adjacent damper and whereby the arms 15 and cross arms 20 extend into an annular area 65 formed between the central member 30 and an inside wall 55 of a tube 60. The result of the rotational differences are evident in FIG. 3. While there is no contact between the damper 10 and the wall 55, the arms extend outwards far enough that pellets 70 are interrupted by the arms 15, 20 from free falling to the bottom of the tube 60. Depending on the job and the needs of an operator, the arms 15 can extend outwards at a 90 degree angle from the central member and the cross arms 20 can likewise extend at a 90 degree angle from the arms. FIG. 4 illustrates the loading tool in use. The tool is lowered into tube the 60 in a coaxial manner with an annular space between the tool and an inner wall 55 of the tube. Thereafter, pellets 70 are dropped into the tube 60 and contact various dampers as they fall towards the bottom of the tube. The tool can either remain stationary in the tube the pellets approach the bottom of the tool, at which point the tool can be periodically raised until the tube is full, or the tool can be gradually and continuously pulled upwards as the tube fills. Either of these two methods can be accomplished manually or automatically with an appropriate mechanical device.

Figure 5:
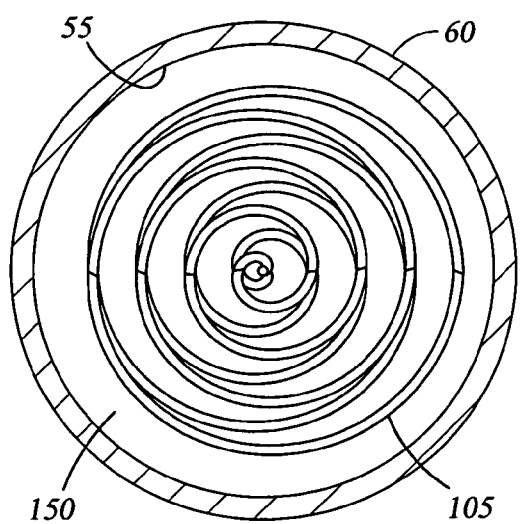
FIG. 5 is a top view of another embodiment of a tool where the dampers are spiral-shaped.
Figure 6:
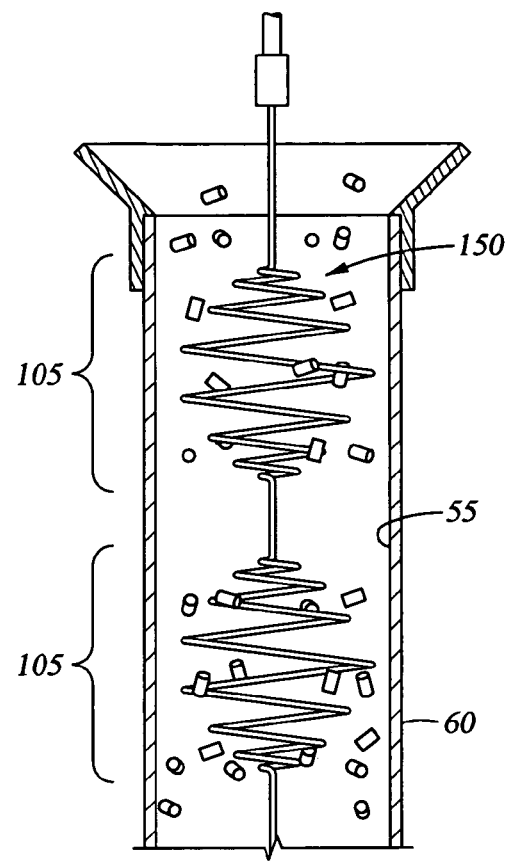
FIG. 6 is a side view showing the spiral-shaped dampers in a tube being filled with pellets.
Figure 6:
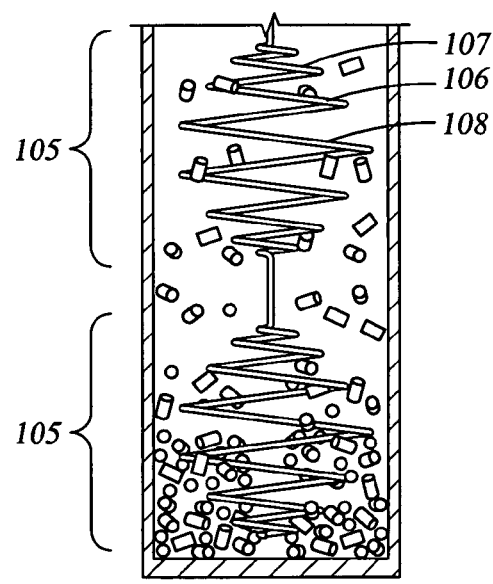

FIGS. 5 and 6 illustrate another embodiment of the loading tool 150. As shown, the dampers 105 making up the tool consist of a plurality of spiral or helix-shaped members, each of which has a slightly increased or reduced outer diameter than the adjacent spiral and all preferably formed of the same wire or stiffened member. FIG. 5 is a top view showing how the spiral shapes of the dampers 105 substantially cover the interior of a tube to stop the freefall of pellets being loaded into the tube. Considering FIG. 6, it can be appreciated for example, that spiral 106 is larger in diameter than the spiral 107 thereabove but is smaller than the next lower spiral 108. In the embodiment shown in FIG. 6, the spirals increase in diameter along a first longitudinal length of the tool and then decrease along a second length. In this manner, the loading tool has a consistent center line and the stiffened member from which it is formed can traverse a portion of the tube prior to forming another group of dampers. In each case, an annular area remains between the outer diameter of each damper and an inside wall 55 of the tube 60. Shaping of the damper members and changes to length, stiffness, number, axial spacing of the spirals along the length of the wire, etc., can be adapted to the material to be filled into the tube and the size of the tube. These changes can be accomplished since the damper is relatively inexpensive and can be adjusted easily. As shown in FIG. 6, multiple dampers can be used along a tube's length and the distance between them can be varied.

In another embodiment shown in FIGS. 7 and 8, each damper 200 of the loading tool is formed in the shape of a partial "Z" and each is connected in a rotationally fixed and distinct manner relative to dampers above and below it. Each Z shape includes an upper horizontal leg 210, a diagonal connecting leg 215 and a lower horizontal leg 220. Upper and lower legs 210 and 220 are foreshortened and connected to a leg of the next Z at a mid point 221 such that a constant center line of the damper is maintained relative to the longitudinal axis of the tube 60. Due to the unitary design, the dampers 200 can be formed of stiff material and in a manner whereby they remain rotationally distinct from each other while sharing the same center line.

Figure 7:
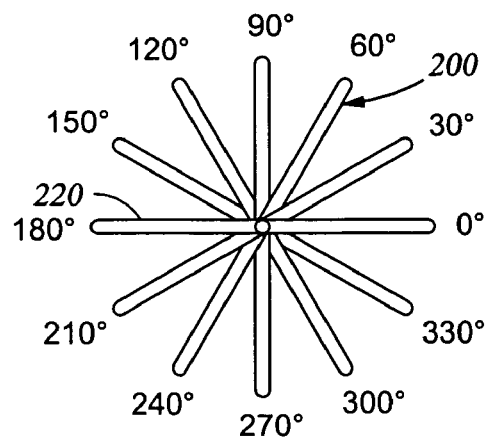
FIG. 7 is a top view of another embodiment of the invention wherein the damper members are vertically arranged and rotated relative to each other.

FIG. 7 is a top view of one arrangement as it would appear in a tube 60. The Z-shaped dampers 200 are arranged whereby they cover essentially the entire radial area of the inner potion of the tube (only the upper leg 200 of each Z shape is visible). In the embodiment of FIG. 7, the dampers 200 are each rotated 30 degrees counterclockwise from the damper thereabove and the relative angle of each from the horizontal is labeled. The result is a stair-stepped appearance that is illustrated in a side view in FIG. 8 where two complete tools A, B are connected together to form one longer tool that extends the length of the tube 60.

Figure 8:
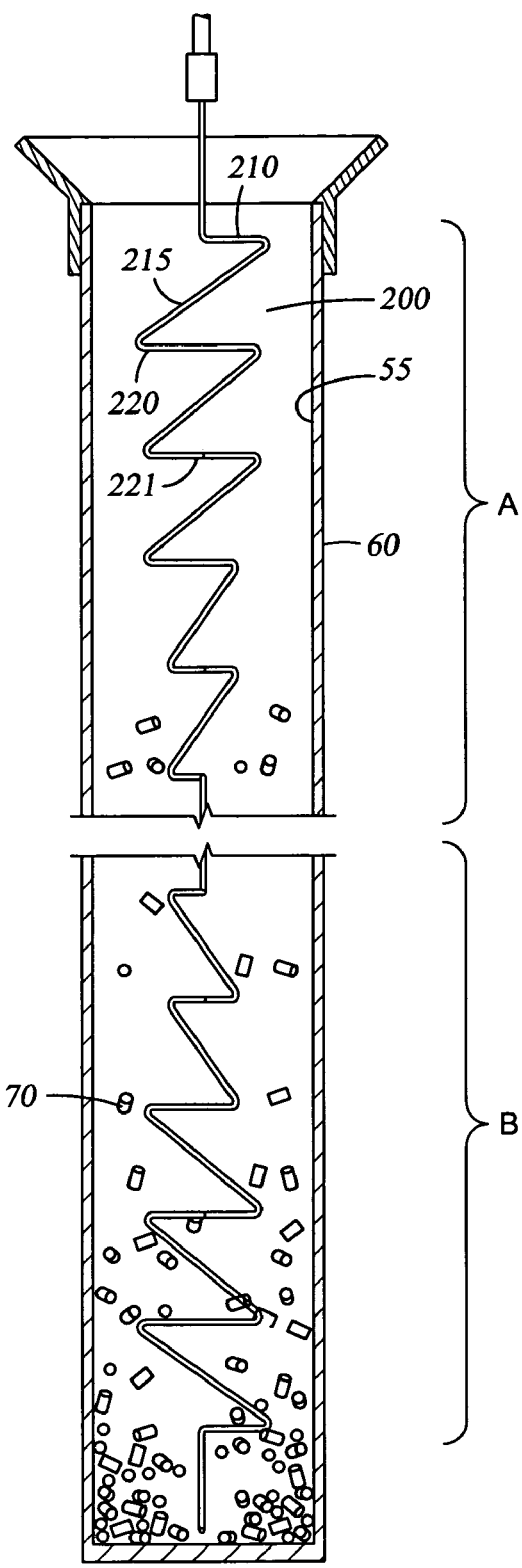
FIG. 8 is a side view showing the embodiment of FIG. 7 in a tube being filled with pellets.

In addition to the clocked arrangement of FIGS. 7 and 8, the shapes can be alternately rotated between clockwise and counterclockwise. By "clocking" the shapes in this manner, the pellets 70 are never permitted to fall very far in the tube 60 without hitting a damper. In other words, the vertical distance between dampers along any straight vertical path in the tube is minimized by the design. For example, a first Z could be rotated 30 degrees clockwise from the Z thereabove. A second Z below the first could then be rotated 30 degrees counterclockwise from the first Z. The arrangement creates a loading tool wherein legs of the various Zs are more likely to contact a falling pellet at more equal intervals along the length of the tube 60.

Since the damper members do not occupy a substantial portion of the cross section of the tube at any particular axial location they can be rigid or flexible and still permit the particles to fall. The loading tool can be moved or jerked primarily in both directions axially and is pulled gradually out of the tube as the tube is filled, or it can remain stationary while a predetermined amount of catalyst is being added and then pulled upwards in the tube between catalyst filling sequences. As the loading tool is removed from the tube, it can be broken into sections at weakened locations along its length. Therefore, the amount of the loading tool that has to be handled outside of the tube is limited to the length between weakened portions. The particles can pour down into the tube through a funnel that is removed after filling is completed. However, the particles can be added to the tube through other methods known in the art. While the examples shown include "Z" shapes, it will be understood that the dampeners could be of a variety of shapes, which can all be substantially identical along the center member. For example, the shapes can be symmetrical or uniformly asymmetrical in geometry and can provide a balanced, limited coverage of the annulus formed between a centerline of the tube and a wall of the tube.

Periodic adjustments of the height of the lowest extremity of the center member can be made manually. This is accomplished by physically feeling the wire member change from tension to slackness as the lowest extremity of the center member contacts the catalyst interface, similar to the sensation from a weighted fishing line contacting the bottom of a body of water. In one embodiment of the present invention, periodic adjustments also can be assisted by the addition of a sensor member at the lowest extremity of the center member. This sensor member can communicate with the top of the center member to provide visual or auditory indication of contact with the catalyst interface.

With embodiments of the present invention, a novel, reproducible, and quick filling method is disclosed. The method is gentle to the particles such that crushing of particles during the filling operation is avoided. An even filling of the tube is also obtained, and thus one result has been avoidance of uneven temperature distribution when a tube filled with catalyst is in operation. Further, an even density of particles in the tubes is attained without exposing them to tapping/vibration, which is both time-consuming and damaging to the tubes. Consequently, time is saved both during filling and also since the tubes do not have to be tapped. The method is simple, cost efficient, and can be modified both quickly and easily. Additionally, it is to only a very small degree dependent upon whoever is the particular operator during the filling process. Furthermore, errors connected with filling of particles into socks are avoided. A substantial degree of freedom regarding packaging and the form of transport for the particles also is obtained.

While the foregoing is directed to embodiments of the present invention, other and further embodiments of the invention may be devised without departing from the basic scope thereof, and the scope thereof is determined by the claims that follow.

The invention claimed is:

1. A loading tool for distributing solid particles into a tube, comprising:
    a center member; and
    a plurality of substantially identical damper members disposed along the center member, each damper member including a central portion having a cylindrically shaped body with a bore there through for receiving the center member having a cylindrically shaped body with a bore there through for receiving the center member and at least two rigid and opposing arms extending outwards from the central portion at substantially ninety degrees from the center member in at least two opposing directions, wherein at least one damper member is rotationally distinct from adjacent damper members on both sides thereof, and wherein each arm includes a cross arm extending from a distal end thereof at an angle of up to ninety degrees and terminates to form respective free ends of each of the arms distal to the center member.

2. The loading tool of claim 1, wherein multiple pluralities of damper members extend between an upper and lower end of the center member.

3. The loading tool of claim 1, wherein each arm includes a cylindrically shaped body.

4. The loading tool of claim 1, wherein each cross arm includes a cylindrically shaped body.

5. The loading tool of claim 1, wherein the length of each cross arm is greater than the length of the remaining portion of each arm.

6. A method of distributing solid particles into a tube, comprising:
    positioning a loading tool in an interior of the tube, the loading tool having a center member and a plurality of substantially identical damper members connected to the center member, wherein each damper member includes at least two rigid arms extending outwards at substantially ninety degrees from the center member in at least two opposing directions and each damper member is rotationally distinct from adjacent damper members, wherein each arm further includes a cross arm extending from a distal end thereof at an angle of up to ninety degrees;
    filling the tube with the solid particles, wherein the solid particles contact at least some of the plurality of damper members; and
    removing the loading tool from the tube.

7. The method of claim 6, wherein the loading tool is removed as the solid particles fill the tube.

8. The method of claim 6, further comprising sensing a first position of a first portion of the center member within the tube.

9. The method of claim 8, further comprising adjusting the first position of the first portion to a second position within the tube in response to the sensed first position.

10. The method of claim 8, further comprising communicating the first position of the first portion to a second portion of the center member.

11. The method of claim 10, further comprising adjusting the first position of the first portion to a second position within the tube in response to the communicated first position.

12. The method of claim 6, further comprising breaking the loading tool into sections as it is removed from the tube.

13. The method of claim 6, further comprising maintaining the loading tool in a rotationally fixed position while filling the tube with the solid particles.

* * * * *

UNITED STATES PATENT AND TRADEMARK OFFICE
CERTIFICATE OF CORRECTION

| | |
|---|---|
| PATENT NO. | : 7,712,490 B2 |
| APPLICATION NO. | : 11/377798 |
| DATED | : May 11, 2010 |
| INVENTOR(S) | : Brennom |

It is certified that error appears in the above-identified patent and that said Letters Patent is hereby corrected as shown below:

Column 5, Claim 1, Lines 37-38, please delete "having a cylindrically shaped body with a bore there through for receiving the center member".

Signed and Sealed this

Seventeenth Day of August, 2010

David J. Kappos
*Director of the United States Patent and Trademark Office*